United States Patent [19]
Komatsu et al.

[11] Patent Number: 5,608,513
[45] Date of Patent: Mar. 4, 1997

[54] RANGE FINDING DEVICE

[75] Inventors: Sachiaki Komatsu; Akio Izumi, both of Nagano, Japan

[73] Assignee: Fuji Electric Co., Ltd., Japan

[21] Appl. No.: 284,100

[22] Filed: Aug. 2, 1994

[30] Foreign Application Priority Data

Aug. 6, 1993 [JP] Japan .................................. 5-195857

[51] Int. Cl.⁶ .................................................. B32B 31/00
[52] U.S. Cl. .......................... 356/3; 156/304.5; 156/305
[58] Field of Search .......................... 156/94, 295, 304.5, 156/305, 578; 356/3

[56] References Cited

U.S. PATENT DOCUMENTS 4,868,722 9/1989 Haraden .................................. 362/80

OTHER PUBLICATIONS

Scientific Honeyweller, vol. 3, No. 1, Mar. 1982 "Electronic Focus for Cameras" pp. 1–13.
Minolta Techno Report Special Issue, 1986, Automatic Assembly System for AF Sensor Module, by J. Shinya et al. pp. 49–52.
Minolta Techno Report Special Issue, 1986, AF Sensor Module by T. Karasaki, pp. 40–48.

*Primary Examiner*—James Engel
*Attorney, Agent, or Firm*—Rossi & Associates

[57] ABSTRACT

A range finding device for automatic focussing can be accurately assembled and has a good external appearance. The range finding device includes an optical lens block having coupling members projecting from the lenses, which further include a protrusion and side walls formed on both sides of the protrusion which are taller than the protrusion. The length of the protrusion is shorter than width of the side walls. The protrusion is partly constricted by a recess portion to form a constriction portion. The range finding device further includes an optical waveguide case having a pair of windows formed on an upper surface and a pair of coupling members formed on both sides of the windows, which further includes a fitting surface that fits to a bottom surface of the coupling member, a pair of protrusions standing on both ends of the fitting surface between which the side walls of the coupling member are inserted, and a liquid pool formed as a shallow groove on the fitting surface.

1 Claim, 5 Drawing Sheets

RANGE FINDING DEVICE

FIELD OF THE INVENTION

The present invention relates to a range finding device (range finder unit or module) that is suitable to be mounted on an auto-focussing camera, and more specifically, the present invention relates to a bonding structure for bonding an optical lens with an optical waveguide of the range finding device.

BACKGROUND

A range finding device for measuring distance based on triangulation by external ray that is suitable for automatic focussing comprises, as FIG. 4 shows, an optical imaging system further comprising a pair of lenses $1_R$ and $1_L$ disposed on a front surface of a camera and an integrated semiconductor range finder chip 5 that further comprises a pair of photo-sensor array $2_R$ and $2_L$ which converts an image of a subject from the optical imaging system into electric signals; a pair of quantizer circuits $3_R$ and $3_L$ which converts the electric signals from the photo-sensor array $2_R$ and $2_L$ into digital signals; and a logic circuit block which calculates a distance signal based on the digital signals from the quantizer circuits $3_R$ and $3_L$. The image of the subject T is projected onto the photo-sensor array $2_R$ and $2_L$ on the chip 5 through the lenses $1_R$ and $1_L$ which are separated by base line length B.

Distance d between the subject and the lenses is given on the basis of triangulation by a following equation:

$$d = f_e / (X_1 + X_2) = B \cdot f_e / X, \qquad (1)$$

where, fe represents distance between the lenses $1_L$ and $1_R$ and the photo-sensor array $2_R$ and $2_L$ (that is equal to the focussing length of the lenses $1_R$ and $1_L$), $X_1$ and $X_2$ represent distances between image spots and standard image spots of the subject T at infinity on the photo-sensor array $2_R$ and $2_L$, and X ($=X_1+X_2$) represents relative displacement (phase difference) of the subject image on the photo-sensor array $2_R$ and $2_L$.

The range finding device is integrated into a unit or a module to facilitate mounting the range finding device on a camera manufactured by a camera maker as a range finder user. FIGS. 5 and 6 show a conventional range finder unit for automatic focussing. The conventional range finder unit comprises an optical lens block 1 into that lenses $1_R$ and $1_L$ are integrated; a box like optical waveguide case 6 that has a pair of windows $6_R$ and $6_L$ and guides rays from the lenses $1_R$ and $1_L$; the photo-sensor array $2_R$ and $2_L$ onto which the rays are projected through a bottom surface of the optical waveguide case 6; and an IC package in that the integrated semiconductor range finder chip 5 is sealed. The range finder unit is divided into three parts. The optical lens block 1 further comprises a protrusion $8_R$ projecting from the lens $1_R$ and protrusion $8_R$ projecting from the lens $1_L$. The protrusions $8_R$ and $8_K$ are integrated to the lenses $1_R$ and $1_L$ respectively. A fitting groove 9 is formed on each of the protrusions $8_R$ and $8_L$. Projections 10 are formed on right and left sides of the upper surface of the optical waveguide case.

In an assembling process of the optical lens block 1 with the optical waveguide case 6, the protrusion 10 is inserted into the fitting groove 9 and then the protrusion 10 is fixed to the fitting groove 9 by injecting a solvent or an adhesive into a gap between the fitting surfaces of the groove 9 and the protrusion 10. When the optical lens block 1 and the optical waveguide case 6 are made of same family of mold resin, the fitting surfaces are bonded together by dissolving the fitting surfaces with a volatile solvent and then evaporating the solvent. An adhesive is used when the optical lens block 1 and the optical waveguide case 6 are made of different material.

The assembling method according to the prior art, however, fixes the optical lens block 1 with the optical waveguide case 6 by a solvent or an adhesive injected into the gaps between the groove 9 of the optical lens block 1 and the protrusion 10 of the optical waveguide case 6 causes poor bonding, bad external appearance and therefore low production yield. If the gap between the fitting surfaces, into which the solvent or the adhesive should be injected, is too narrow when the protrusion 10 is inserted into the groove 9, the solvent or the adhesive is not sucked deep into the gap by capillarity to cause uneven bonding. Then, an excessive solvent or adhesive runs down an outer surface of the case and dissolves the outer surface or solidifies on the outer surface to cause bad external appearance. To the contrary, when the gap is too wide, the solvent or the adhesive is easily sucked into the gap by capillary action. However, parallel orientation of the optical imaging system is distorted and centering of the optical axis of the optical lens block 1 is hardly accomplished because the solvent or the adhesive localizes when the gap is too wide. If one designs the groove 9 and the protrusion 10 with acceptable fitting gap tolerance, the actual gap spacing shows unavoidable dispersion from a product to a product because of the dimensional dispersion caused through the molding process. Thus the conventional range finder unit are subject to poor bonding, bad external appearance and low yield. Further more, productivity is low and production cost is high according to the prior art, because highly mature skilled labor is required for adjusting injection amount of the solvent or the adhesive and selection of the spot where the solvent or the adhesive is injected from.

In view of the foregoing, an object of the present invention is to provide a range finding device that prevents the poor bonding and bad external appearance associated with fixing of optical lens block to the optical waveguide case of range finder unit by providing the range finding device with an injection means that facilitates injection of a solvent or an adhesive.

SUMMARY OF THE INVENTION

The object of the present invention is achieved by a range finding device that comprises an injection means for injecting and temporarily storing a solvent or an adhesive for bonding an optical lens block with an optical waveguide case. More specifically, the range finding device comprises an optical lens block that further comprises an object lens and the first coupling member projecting from a side of the object lens that further comprises a recess portion formed on the first coupling member; and an optical waveguide case that further comprises a second coupling member to that the first coupling member fits. The second coupling member further comprises a fitting surface so that a bottom surface of the first coupling member fits and a liquid pool formed on the fitting surface at least a part of which is exposed to the recess portion.

The first coupling member further comprises a constriction portion constricted by the recess portion preferably formed in the central part of the first coupling member. The constriction portion preferably comprises a slope that tilts down to the liquid pool.

The injection means facilitates temporarily storing the solvent or the adhesive and promotes uniform and deep sucking of the solvent or an adhesive to a gap between the optical lens block and an optical wave guide case. The optical lens block is fixed to the optical waveguide case as follows. At first, the first coupling member of the optical lens block is inserted into the second coupling member of the optical waveguide case, and then relative positioning of the first and second coupling members is adjusted. Once the relative positioning of the first and second coupling members is adjusted, a part of the liquid pool is exposed to the recess portion of the first coupling member. The solvent or the adhesive is injected into the liquid pool to store the solvent or the adhesive in the liquid pool. The stored solvent or adhesive is sucked into the gap between the fitting surfaces of the first and second coupling members by capillary action. Thus bonding between the optical lens block and the optical waveguide case is completed. The bonding is automatically accomplished by simply filling the liquid pool to its maximum capacity with the solvent or the adhesive.

If the liquid pool is over-filled with the solvent or the adhesive, surface tension prevents the solvent or the adhesive from running down the side faces of the optical waveguide case. If an excessive solvent or adhesive remains in the liquid pool, the excessive solvent or adhesive will evaporate or solidify in the liquid pool and will not harm the external appearance. A high degree of skill is not required for fixing the optical lens block to the optical waveguide case.

The constriction portion formed in the central part of the first coupling member facilitates sucking the solvent or the adhesive uniformly and deeply into the gap, and realizing uniform bonding of the fitting surfaces.

The slope of the constriction portion of the first coupling member plays a roll of funnel to facilitates injecting the solvent or the adhesive into the liquid pool without any trouble and simplifies the injecting of the solvent or the adhesive into the liquid pool.

BRIEF DESCRIPTION OF THE DRAWINGS

The invention will be described in greater detail with reference to certain preferred embodiments thereof and the accompanying drawings, wherein:

FIG. 2 shows diagrams of the embodiment of the range finding device, in which

FIG. 6 shows diagrams of the range finder unit according to the prior art, in which

DETAILED DESCRIPTION OF THE PREFERRED EMBODIMENTS

The present invention will be described in detail hereinafter with reference to the accompanied drawings which illustrate preferred embodiments of the present invention.

Figure 1:
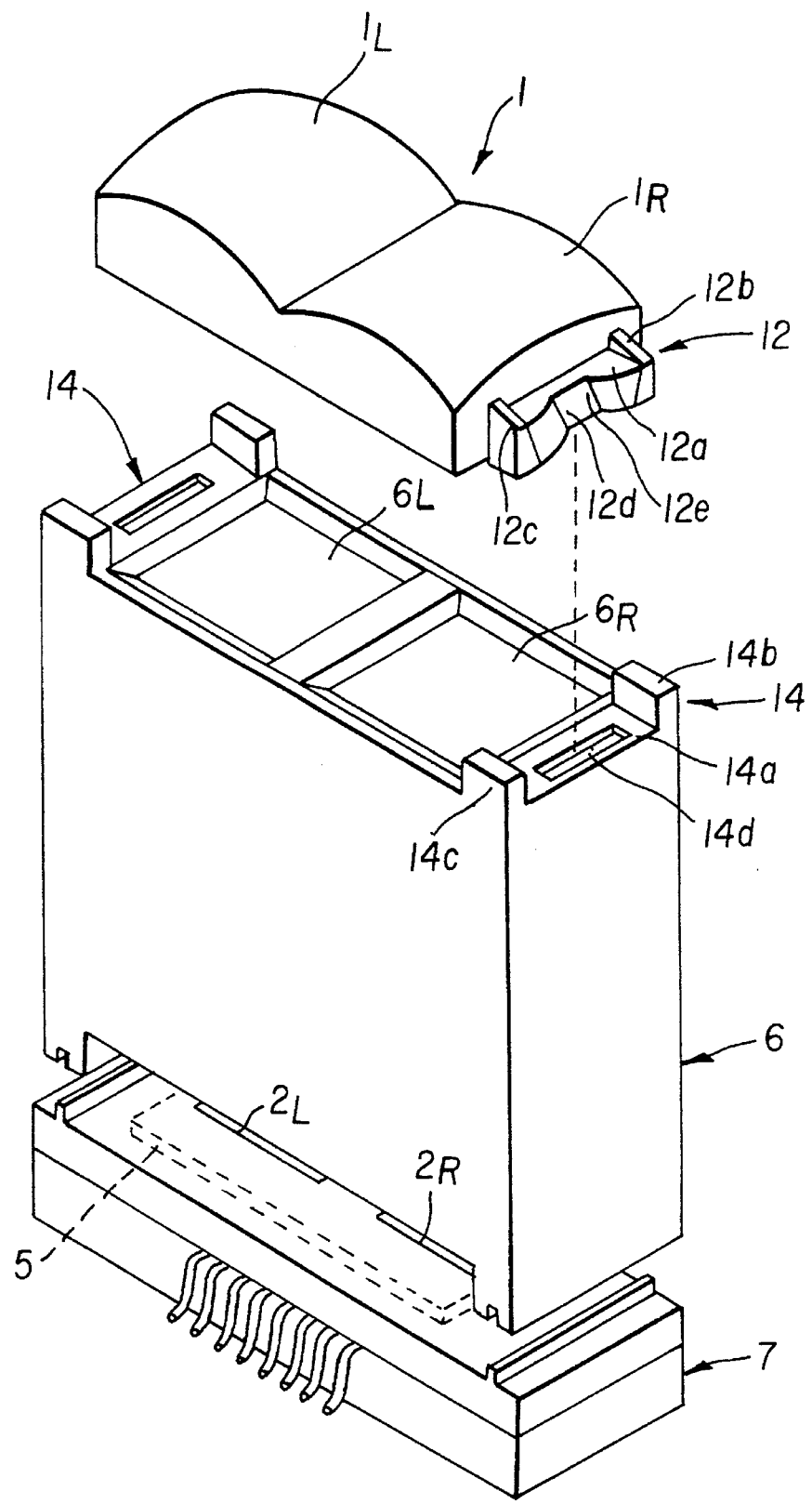
FIG. 1 is an exploded perspective view of an embodiment of the range finding device for automatic focussing according to the present invention.
Figure 2A:
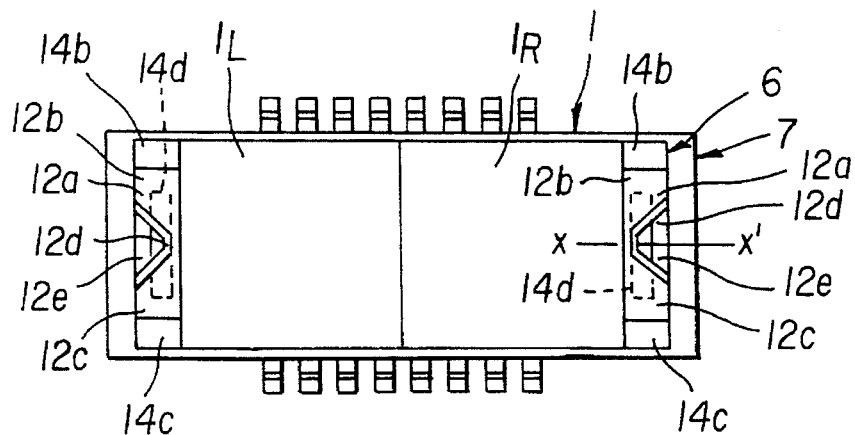
FIG. 2(a) is a top plan view, FIG. 2(b) a front plan view, and FIG. 2(c) a side plan view.
Figure 2B:
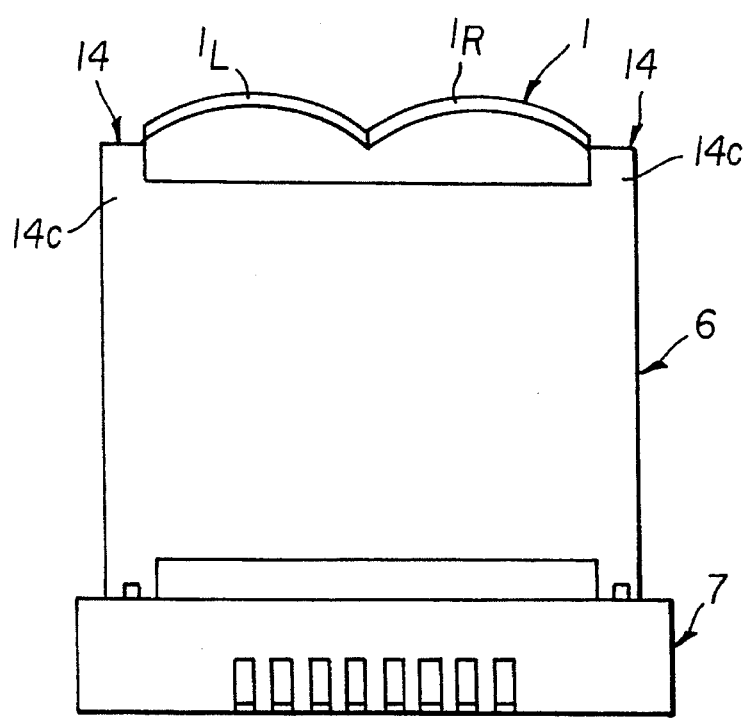
Figure 2C:
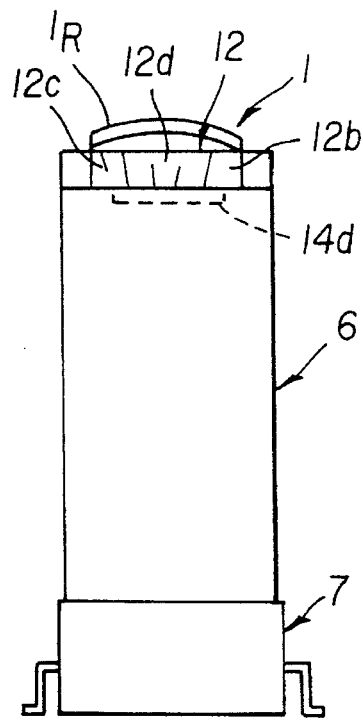
Figure 3:
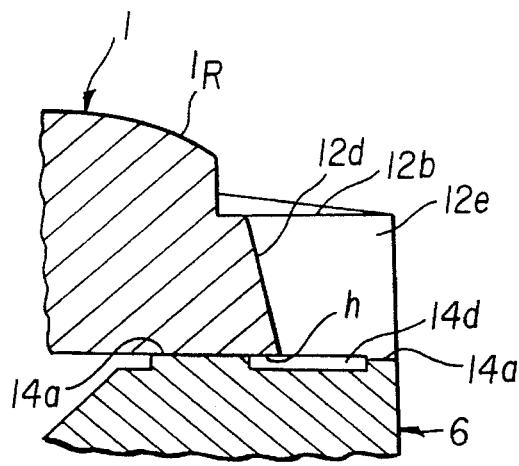
FIG. 3 is a sectional view taken along X–X' of FIG. 2(a)
Figure 4:
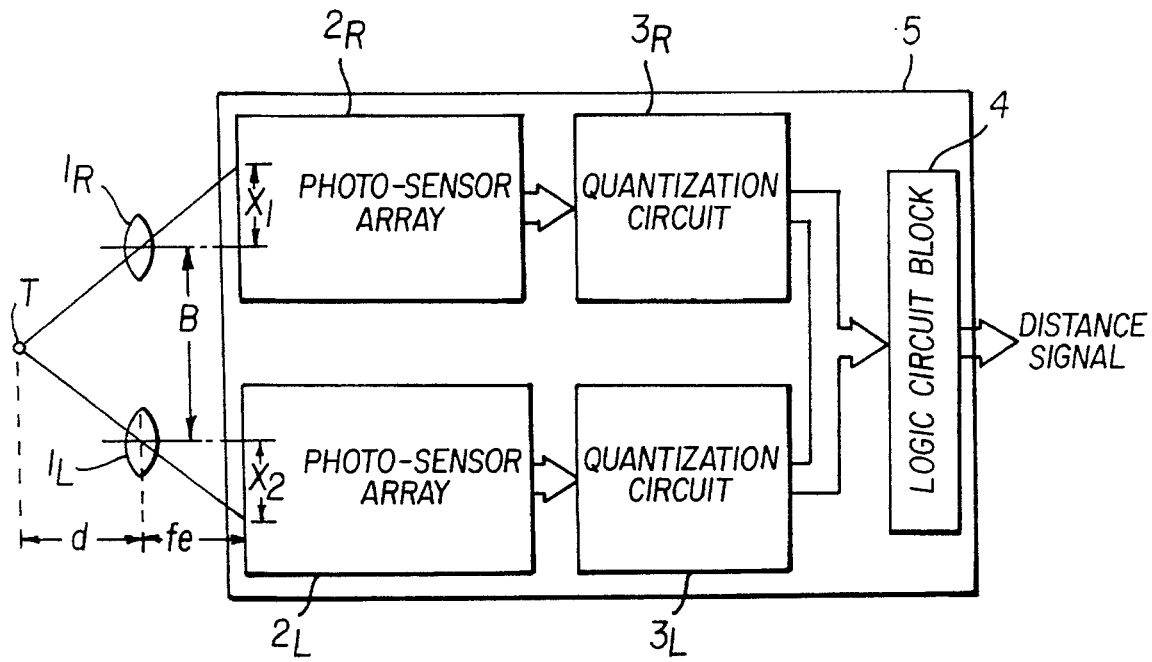
FIG. 4 is a block diagram schematically showing a range finding device based on triangulation by external ray.
Figure 5:
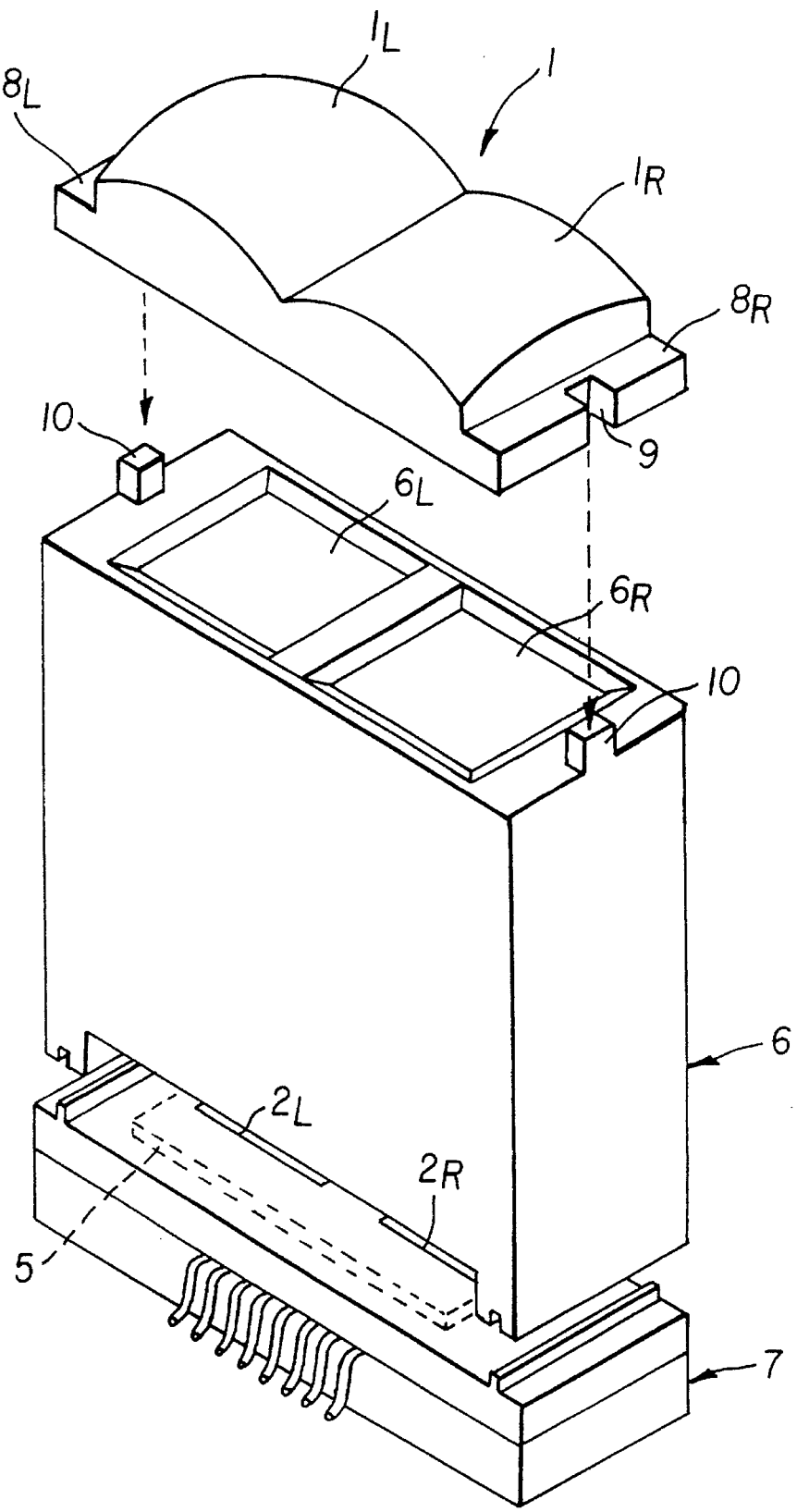
FIG. 5 is an exploded perspective view of an embodiment of the range finder unit for automatic focussing according to the prior art.
Figure 6A:
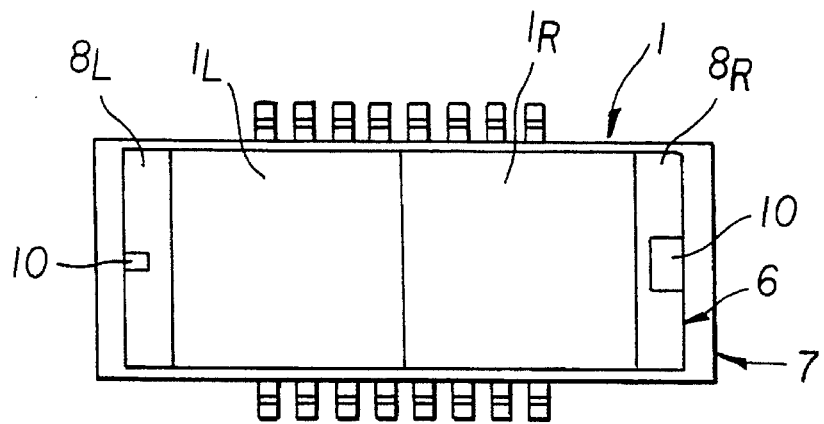
FIG. 6(a) is a top plan view, FIG. 6(b) a front plan view, and FIG. 6(c) a side plan view.
Figure 6B:
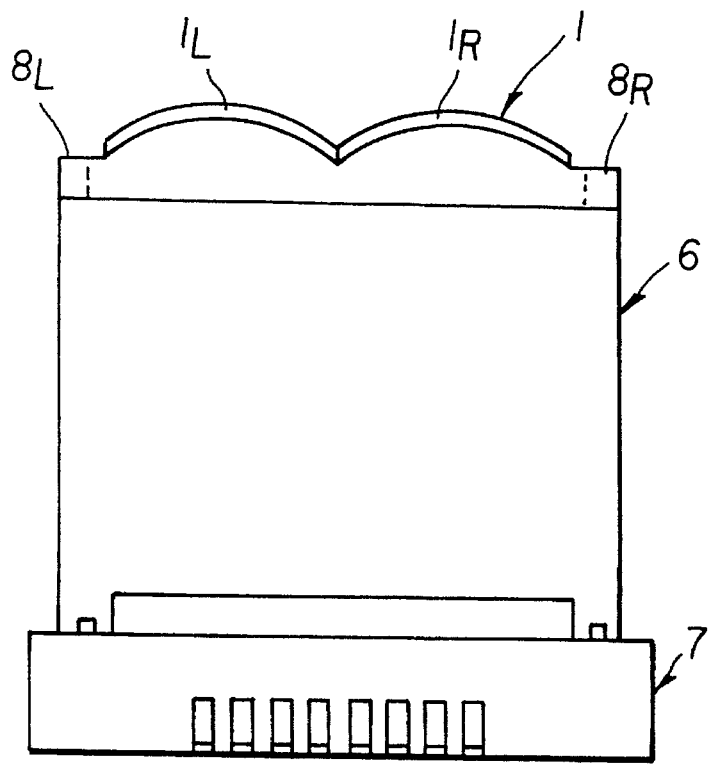
Figure 6C:
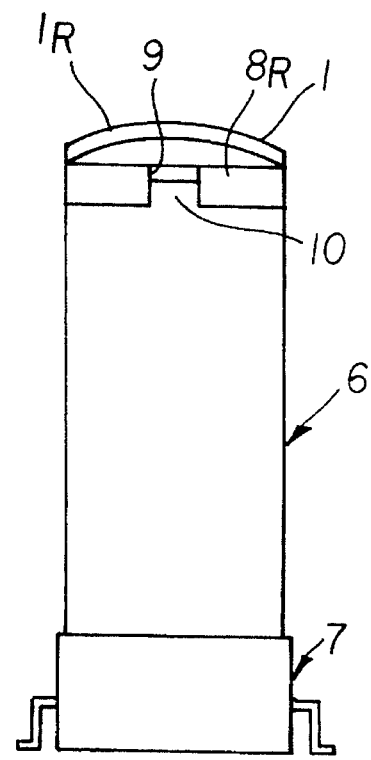

FIG. 1 is an exploded perspective view of an embodiment of the range finding device for automatic focussing according to the present invention. FIG. 2 shows diagrams of the embodiment of the range finding device, in which FIG. 2(a) is a top plan view, FIG. 2(b) a front plan view, and FIG. 2(c) a side plan view. FIG. 3 is a sectional view taken along X–X' of FIG. 2(a). Similar parts in FIGS. 1 and 2 as in FIGS. 5 and 6 are designated by the same reference numerals and their explanations are omitted.

As shown in FIGS. 1 and 2(a)–(c), a range finding device of the present invention comprises an optical lens block 1 made of mold resin into which lenses $1_R$ and $1_L$ are integrated; a box like optical waveguide case 6 made of mold resin that has a pair of windows $6_R$ and $6_L$ and guides rays from the lenses $1_R$ and $1_L$; the photo-sensor array $2_R$ and $2_L$ onto which the rays are projected through a bottom surface of the optical waveguide case 6; and an IC package 7 in that the integrated semiconductor range finder chip 5 is sealed. The range finding device is divided into three main parts.

The optical lens block 1 further comprises coupling members 12 (the first coupling members) integrated to and projecting from the lenses $1_R$ and $1_L$. The coupling member 12 further comprises a protrusion 12a, and side walls 12b and 12c formed on both side of the protrusion 12a which are taller than the protrusion 12a. Protrusion length of the protrusion 12a is shorter than width of the side walls 12b and 12c. Central part of the protrusion 12a is constricted by a recess portion 12e to form a constriction portion 12d. A side wall of the constriction portion 12d comprises a slope.

The optical waveguide case 6 further comprises a pair of windows $6_R$ and $6_L$ formed on an upper surface and a pair of coupling members 14 and 14 (the second coupling members) formed on both side of the windows $6_R$ and $6_L$. The coupling member 14 further comprises a fitting surface 14a that fits to a bottom surface of the first coupling member 12; a pair of protrusions 14b and 14c standing on both sides of the fitting surface 14a between which the pair of the side walls 12b and 12c of the coupling member 12 is inserted; and a liquid pool 14d formed as a shallow groove or a shallow slot on the fitting surface 14a.

The optical lens block 1 is fixed to the optical waveguide case 6 as described below. The coupling member 12 of the optical lens block 1 is inserted and its position is adjusted between the protrusions 14b and 14c of the optical waveguide case 6. Once the coupling member 12 is inserted and its position is adjusted, the liquid pool 14d is exposed to the recess portion 12e in the bottom of the constriction portion 12d constricted by the recess portion 12e. A solvent or an adhesive injected with a syringe in the recess portion 12e is stored in the liquid pool 14d and then sucked by capillary action into a gap between the bottom surface of the coupling member 12 and the fitting surface 14a. Thus the optical lens block 1 is bonded to the optical waveguide member 6.

As FIG. 3 shows, a part of the bottom portion of the coupling member 12 hangs over the liquid pool 14d to form an overhang portion h. The overhang portion h guides the solvent or the adhesive to the gap and promotes smooth feed of the solvent or the adhesive to the gap. When a volatile solvent is used, the overhang portion h prevents the volatile solvent from evaporating and keeps wetting a mouth of the gap. Even when the overhang portion h is not provided, the solvent or the adhesive is supplied to the gap without any trouble insofar as the solvent or the adhesive is loaded to the level of the gap. Therefore bonding between the optical lens block 1 and the optical waveguide case 6 is accomplished without any further operations except filling the liquid pool 14d with the solvent or the adhesive. Surface tension prevents the solvent or the adhesive from running down the side wall of the optical waveguide case 6 even when a bit excessive solvent or adhesive is injected into the liquid pool 14d. An external appearance of the optical waveguide case 6 is not harmed since the excessive solvent or adhesive evaporates or solidifies in the liquid pool 14a. It is preferable to drop the solvent or the adhesive onto the side wall of the constriction portion 12d since the side wall is formed as a slope that works as a funnel for guiding the solvent or the adhesive to the liquid pool 14a. The constriction portion 12d and the liquid pool 14a constitute an injection means. The hangover portion h is included in the injection means.

The side walls 12b and 12c of the embodiment described above formed on both side of the protrusion 12a of the optical lens block 1 may be omitted if desired.

Though the constriction portion 12d of the embodiment described above formed in the central part of the protrusion 12a may be shifted to an end portion of the protrusion 12a so that an end portion of the liquid pool 14d is exposed to the recess portion 12e shifted in association with the positional shift of the constriction portion 12d. However, the constriction portion 12d formed in the central part of the protrusion 12a as in the embodiment described above facilitates feeding the solvent or the adhesive evenly deep into the gap and realizing uniform bonding of the fitting surfaces.

Application of the range finding device of the present invention is not limited to automatic focussing.

The following effects are obtained by the range finding device of the present invention that comprises a recess portion formed in a part of the coupling member of optical lens block and a liquid pool formed on the fitting surface of the optical waveguide case and exposed to the recess portion.

(1) Once the relative positioning of the first and second coupling members is adjusted, a part of the liquid pool is exposed to the recess portion of the first coupling member. The solvent or the adhesive is injected into the liquid pool to store the solvent or the adhesive in the liquid pool. The stored solvent or adhesive is sucked into the gap between the fitting surfaces of the first and second coupling members by capillary action. Thus bonding between the optical lens block and the optical waveguide case is accomplished without any further operation. The bonding is automatically accomplished by simply filling the liquid pool to its maximum capacity with the solvent or the adhesive. If the liquid pool is over-filled with the solvent or the adhesive, surface tension prevents the solvent or the adhesive from running down the side faces of the optical waveguide case. If an excessive solvent or adhesive remains in the liquid pool, the excessive solvent or adhesive will evaporate or solidify in the liquid pool and will not harm the external appearance. Thus manufacturing yield of the range finding device is improved and any well matured skill is not required for fixing the optical lens block to the optical waveguide case.

(2) The constriction portion formed in the central part of the first coupling member facilitates sucking the solvent or the adhesive uniformly and deeply into the gap, and realizing uniform bonding of the fitting surfaces.

(3) The slope of the constriction portion of the first coupling member plays a roll of funnel to facilitates injecting the solvent or the adhesive into the liquid pool without any trouble and simplifies injection of the solvent or the adhesive into the liquid pool.

The invention has been described with reference to certain preferred embodiments thereof. It will be understood, however, that modifications and variations are possible within the scope of the appended claims.

What is claimed is:

1. A range finding device comprising:

an optical lens block comprising an object lens and a first coupling member, projecting from a side of said object lens, said first coupling member further comprising a recess portion formed thereon; and an optical waveguide case comprising a second coupling member to which said first coupling member fits, said second coupling member including a fitting surface to which a bottom surface of said first coupling member fits, and a liquid pool formed on said fitting surface at least a part thereof exposed to said recess portion;

wherein said first coupling member further comprises a constriction portion constricted by said recess portion; and wherein said constriction portion further comprises a side wall slope.

\* \* \* \* \*